United States Patent [19]

Corby, Jr. et al.

[11] Patent Number: 4,532,405
[45] Date of Patent: Jul. 30, 1985

[54] ARC WELDING TORCH WITH TWO INTEGRAL OPTICAL SYSTEMS

[75] Inventors: Nelson R. Corby, Jr.; Richard M. Lund, both of Scotia; Donald C. Peroutky, Schenectady, all of N.Y.

[73] Assignee: General Electric Company, Schenectady, N.Y.

[21] Appl. No.: 554,512

[22] Filed: Nov. 23, 1983

[51] Int. Cl.$^3$ ............................................. B23K 9/12
[52] U.S. Cl. .................................. 219/124.34; 901/9; 901/42
[58] Field of Search ............... 219/124.34, 136, 60 R, 219/124.22, 130.21; 318/577; 356/376, 377, 384, 387; 350/96.24; 901/9, 42

[56] References Cited

U.S. PATENT DOCUMENTS

| 4,412,121 | 10/1983 | Kremers et al. | 219/124.34 |
| 4,450,339 | 5/1984 | Corby, Jr. | 219/124.34 |

FOREIGN PATENT DOCUMENTS

| 0094074 | 11/1983 | European Pat. Off. | 219/60 R |
| 57-62866 | 4/1982 | Japan | 219/124.34 |
| 339361 | 7/1972 | U.S.S.R. | 219/136 |

OTHER PUBLICATIONS

R. W. Richardson et al., "A Vision Based System for Arc Weld Pool Size Control", Measurement and Control for Batch Manufacturing, ed. by D. E. Hardt, ASME WAM, Nov. 14–19, 1982, pp. 65–75.

"Fiber-Optics Couple Arthoscope to TV", NASA Tech. Briefs, vol. 5, No. 4, Fall 1980, pp. 462, 463.

Primary Examiner—Clifford C. Shaw
Attorney, Agent, or Firm—Donald R. Campbell; James C. Davis, Jr.; Paul R. Webb, II

[57] ABSTRACT

A robotic welding system has a remote light pattern generator and a remotely located video camera and controller connected to an arc welding torch by flexible coherent fiber optic bundles. The improved torch has integral projection and viewing optical systems supported on the ring-shaped torch body. The first projects the light pattern onto the workpiece to measure workpiece profile and detect the joint location; the second produces an image of the weld puddle and light pattern for use as feedback information. The optical systems are tilted away from one another at a small angle corresponding to the angle of reflection to provide for optimum interception of the projected light pattern by the viewing optics.

9 Claims, 6 Drawing Figures

ARC WELDING TORCH WITH TWO INTEGRAL OPTICAL SYSTEMS

BACKGROUND OF THE INVENTION

This invention relates to robotic welding systems and to an improved arc welding torch with integrated optics.

Good arc welds are achieved by adaptively controlling weld parameters and closely centering the weld puddle over the seam to be welded. Optimum weld quality requires continuous sensing of seam to puddle displacement, as close to the puddle as possible, and moving the torch to minimize deviation. Excessive seam to puddle deviation may result in poor weld penetration, weak welded joints, or excessive workpiece warping.

Typically, machine welding is accomplished by programming the torch carrier to generally follow the seam path. This method has no provision for preventing random weld puddle wander from the programmed path. Some welding systems use seam sensors separate from and positioned ahead of the torch. The physical separation of sensor from weld puddle in a separate torch-sensor system prevents precise centering of the puddle over the seam at all points along the path. In addition, separate sensors may limit torch maniulation in restricted areas of the workpiece.

A specific object of the invention is to provide an improved gas tungsten or gas metal arc welding torch with integral optics, a more compact welding torch and seam sensing tool which is capable of simultaneously welding and detecting weld puddle characteristics and seam to puddle deviation. This information can be used to optimize the welding process beyond the capabilities of existing welding systems. The present arc welding torch and system are an improvement over copending application Ser. No. 451,129, filed Dec. 20, 1982, now U.S. Pat. No. 4,491,719, N. R. Corby, Jr., "Light Pattern Projector Especially for Welding", assigned to the same assignee.

SUMMARY OF THE INVENTION

An electric arc welding torch for automated welding has two integral optical systems. One system according to an illustrative embodiment projects a structured light pattern on the workpiece adjacent to the weld puddle and is used to detect the seam to be welded. The second system views the weld puddle and projected light pattern for use as feedback information to control weld parameters and to move the torch for centering the weld puddle over the seam.

This welding torch is comprised of a torch body having a central aperture and a slim profile electrode holder. Both optical systems are supported on the torch body. The projection optical system projects the light pattern, such as parallel stripes, through the central aperture onto the workpiece, and the viewing optical system views the weld puddle and light pattern through the central aperture and provides an image of the weld region. The optical axes of the systems have approximately equal inclinations to the torch electrode axis, tilted away from one another, to optimize the light reflected from the projected light pattern that is intercepted by the viewing optics. The optical systems are adjustably mounted on the torch body to independently vary the angle of inclination to give freedom to position the projected light pattern with respect to the electrode.

A robotic welding system further includes a remote light source and means for generating the structured light pattern and transferring it via a flexible coherent fiber optic bundle to the projection optical system on the torch. Another coherent fiber optic bundle transfers the image of the weld region to a video camera and hence to the welding controller.

DETAILED DESCRIPTION OF THE INVENTION

Figure 1:
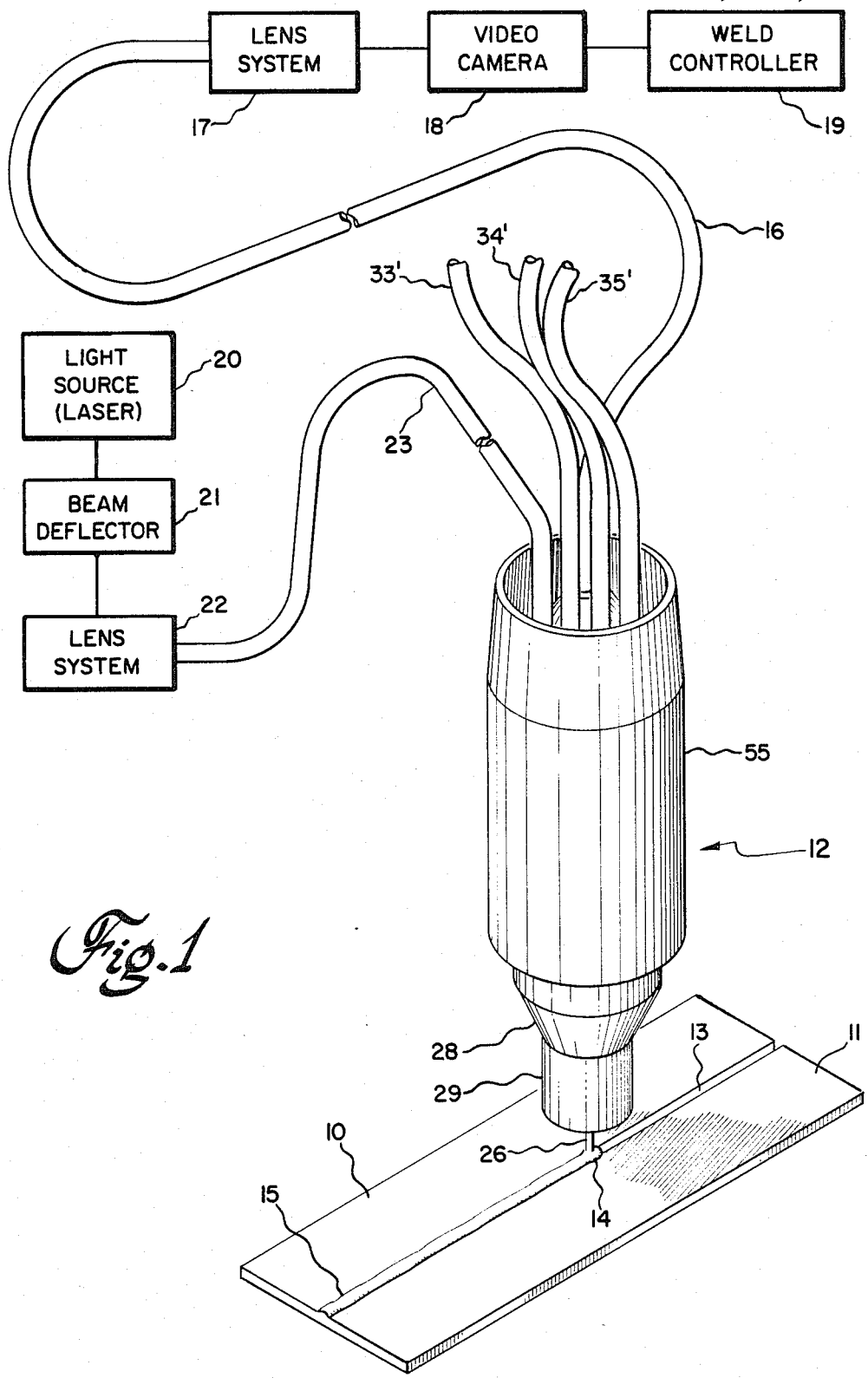
FIG. 1 shows robotic welding with an improved gas tungsten arc welding torch that tracks the seam and has a vision sensor.

In FIG. 1, workpieces 10 and 11 are seam welded by a gas tungsten arc welding (GTAW) torch 12 that has built-in optical systems to project a structured light pattern onto the joint 13 near the welding zone and to directly view the weld region. The weld puddle 14 and remelt zone 15, the joint and structured light pattern, typically two parallel lines, are imaged on the face of a coherent fiber optic bundle 16 by which the image is transferred to a remotely located control system. The image is magnified by a lens system 17 and sent to a video camera 18 such as General Electric's TN2500 Charge Injection Device camera; the video output is fed to a computerized weld controller 19 and used in a feedback arrangement to control welding parameters and move the torch for centering the weld puddle over the seam. The remote components of a programmable light pattern projection system are a light source 20, generally a laser, forming a narrow beam that is directed to a two-dimensional beam deflector 21. The deflected beam is imaged by a lens system 22 onto the entrance of a second coherent fiber optic bundle 23 and traces out the light pattern which is transferred along the flexible bundle to the welding torch.

Figure 2:
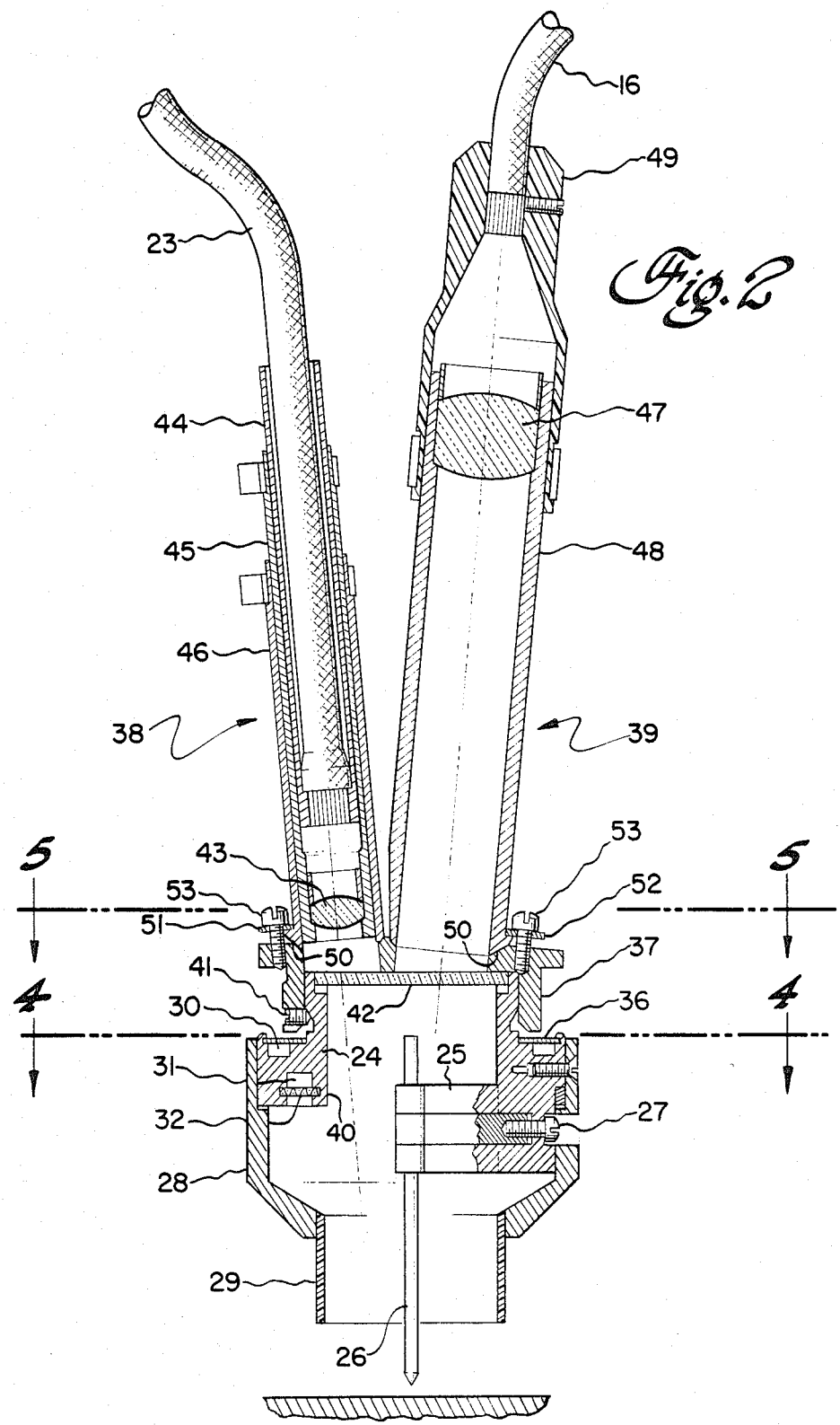
FIG. 2 is a vertical cross section through the welding torch and the two integral optical systems to project a light pattern and image the weld region.
Figure 4:
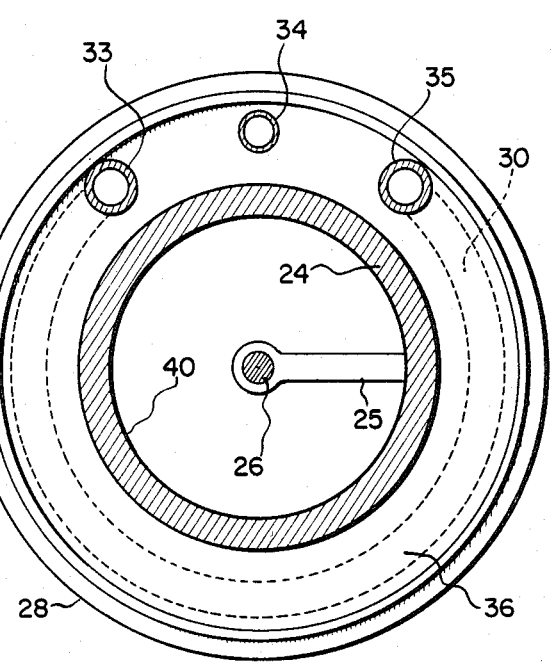
FIGS. 4 and 5 are horizontal cross sectional views of the torch taken approximately on lines 4—4 and 5—5 in FIG. 2.

Referring to FIG. 2, the torch body 24 is similar in configuration and function to that described in other copending applications assigned to the same assignee such as Ser. No. 401,471, filed July 26, 1982, A. W. Case, Jr., N. R. Kuchar and D. C. Peroutky, now abandoned, and continuation application Ser. No. 619,432, now U.S. Pat. No. 4,488,032. The torch body is a copper ring having an inwardly projecting, integral, slim profile electrode holder 25. A downwardly projecting dog leg on the torch body supports two stationary radial arms between which is a movable center arm. Tungsten electrode 26 is inserted through rings at the ends of the arms (see FIG. 4) and clamped by turning a lock screw 27. The lower end of torch body 24 is seated in a shroud ring 28 to which is attached a gas nozzle or cup 29.

Figure 3:
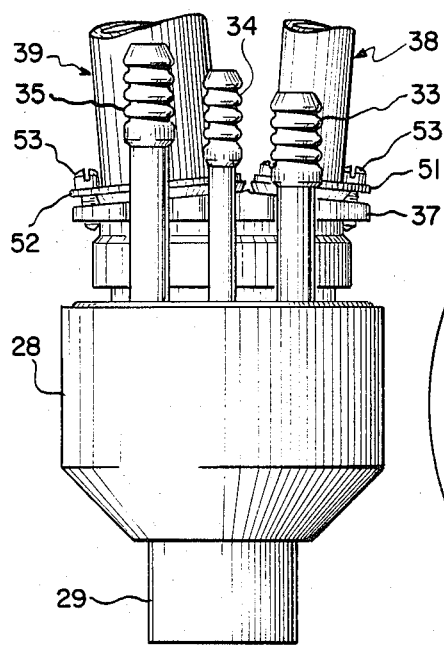
FIG. 3 is a partial side view of the torch showing the gas, water and power connection tubes.

The ring-shaped torch body 24 has passages 30 and 31 for cooling water flow and for cover gas flow. The inert cover gas exits through a gas lens 32 and through gas cup 29 to purge the weld region of air. The gas lens consists of a permeable barrier of alternate layers of fine wire mesh which produce a stable stream of shielding cover gas. By focusing the gas into a coherent stream, the covering ability of the shielding gas is effective at greater gas cup to workpiece distances than is possible without the lens. Three copper tubes 33–35, FIG. 3, are the coolant, electrical power, and gas connections, and are inserted into holes in the top of the torch body 24 and held in place by soldering. A water passage cover 36, FIG. 4, encloses the channel in the upper part of the torch body. Coolant enters one end of this passage through copper tube 33 and exits at the other end through tube 35, one of which connects to a metal braid jacket hose to conduct electrical power to the torch in addition to coolant, as is conventional in the art. Welding cover gas is admitted to passage 31 through the third tube 34.

Attached to the upper end of the torch body 24 is a cap 37 which provides a platform for mounting the structured light projection optical system 38 and puddle view optical system 39. The two optical systems are arranged so their axes have a small but equal inclination to the torch electrode axis. This places the puddle view optical axis at or near the angle of reflection of the structured light projection axis to provide for optimum interception of the structured light pattern by the viewing optics. The weld region is viewed through the central opening 40 of the torch body 24, and the light pattern is projected through this same central aperture. Cap 37 is held in place by screws 41 and secures a transparent, heat reflecting window 42 which isolates the optics from the cover gas and prevents gas flow in any direction except out through gas cup 29.

The projection optical system 38 is comprised of a lens 43 and the end face of coherent fiber optic bundle 23. The lens images the remotely generated structured laser light pattern, which appears on the face of the fiber optic bundle, on the workpiece surface with a magnification ratio of, say, 4:1. Lens and bundle are mounted in separate tubes to permit relative adjustment for focussing. The end of bundle 23 is mounted in an inside tube 44 that is slidable relative to an intermediate tube 45 at the front end of which is carried the projection lens 43. Intermediate tube 45 is in turn slidable, in and out, inside of an outer tube 46. Fiber optic bundle 23 is also rotatable inside of tube 44.

The viewing optical system 39 is comprised of a lens 47 which images the weld region and light pattern on the entrance end of fiber optic bundle 16. Slim profile electrode holder 25 is located sufficiently far from the optical focus region at the weld puddle to provide minimum optical distortion on the face of the fiber optic bundle. Lens 47 is, for instance, a double or triplet, and is mounted in a cylindrical metal lens housing 48. Fiber optic bundle 16 is adjustable to focus the image of the weld region on the face of the cable. A bundle housing 49 made of insulating material slides down over tube 48 and has an interior stop. The end of the cable is held in a cylindrical cavity in the top of the bundle housing.

Figure 5:
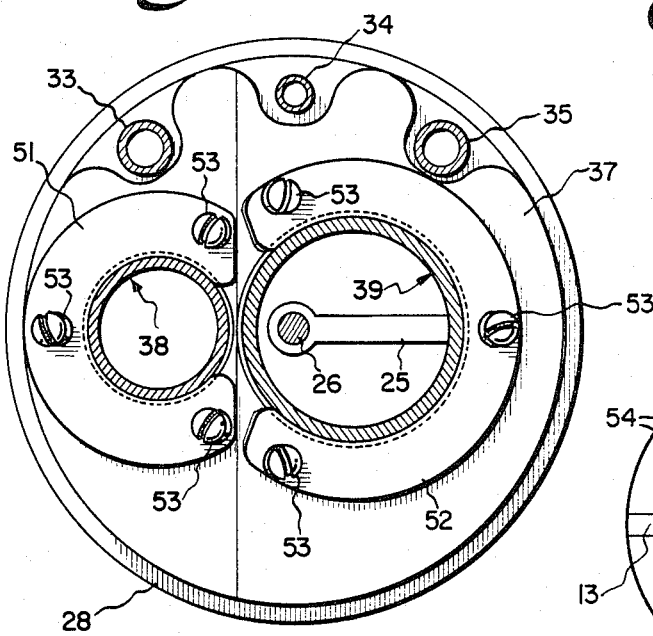

A special mounting for both optical systems 38 and 39 has an adjustment which permits the optical axis of each to be swiveled independently about $\pm 5^0$ from its nominal position at a small angle to the torch electrode axis. Concerning the projection optics, this gives significant freedom in positioning the projected light pattern with respect to the torch electrode 26. Ball and socket joints are provided between the ends of tubes 46 and 48 and cap 37. The cap has countersink holes 50 (FIG. 2) machined in the top of it, and the ends of tubes 46 and 48 have machined spherical radii. Referring also to FIG. 5, hold down rings 51 and 52 engage shoulders at the ends of tubes 46 and 48 and are screwed into the top of cap 37. Three screws 53 are provided for each hold down ring to permit the swivel adjustment and, in particular, varying the angle of inclination to the vertical. The projection system optical axis is tilted, for example, at a normal $5^0$ from the torch electrode axis. The optical axis of the puddle view optical system 39 is tilted nominally $5^0$ from the torch axis away from the projection optical system 38. This tilt is an optimum angle to intercept the light reflected from the projected light pattern on the workpiece. The amount of reflected energy picked up by the viewing optics is maximized.

Figure 6:
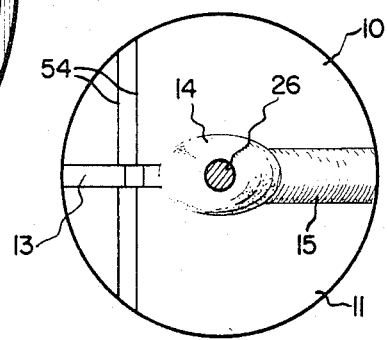
FIG. 6 shows the weld scene seen through the viewing aperture and the projected light stripes.

FIG. 6 shows the field of view of the viewing optical system 39. The structured light pattern is, for instance, two thin, parallel, light stripes 54 projected onto the workpieces ahead of and adjacent to the weld puddle 14. The breaks in the light bars where they cross the joint 13 provide reference points for moving the torch to follow the seam and to closely center the weld puddle over the seam. The fore and aft displacements of the stripes provide height profile measurements. Using special optical filters it is possible to see both the puddle and the laser pattern in the same image; electrode holder 25 is not seen or its image is minimized. Alternatively, the structured light pattern may be focused onto the weld puddle to gain three-dimensional information about puddle topography, or onto the remelt zone 15 to provide transverse profiles for post-weld quality analysis.

An insulating shroud 55 such as that shown in FIG. 1 covers the two integral optical systems 38 and 39 and the cooling, electrical power, and gas connections 33–35, which are near the periphery of torch body 24 and outside of the "towers" or optical systems (see FIG. 5). The water/power cable 33', gas supply line 34', and water hose 35' plus the flexible fiber optic cables 16 and 23 are made to exit away from the weld area.

This gas tungsten arc welding torch with integral optics is a compact welding torch and weld seam sensing tool to simultaneously weld and detect weld puddle characteristics and seam to puddle deviation. This information can be used to optimize the welding process beyond the capabilities of existing welding systems. A gas metal arc welding (GMAW) torch having a vision sensor, such as that described in allowed copending application Ser. No. 528,753, filed Sept. 1, 1983, A. W. Case, Jr. and D. C. Peroutky, can be provided with two such integral optical systems. These applications are all commonly assigned.

While the invention has been particularly shown and described with reference to preferred embodiments thereof, it will be understood by those skilled in the art that various changes in form and details may be made therein without departing from the spirit and scope of the invention.

What is claimed is:

1. An electric arc welding torch for robotic welding comprising:
    a ring-shaped metal torch body having a central aperture, an inwardly projecting slim profile, electrode holder, and cover gas, coolant, and electrical power connections;

a shroud on said torch body to which is attached a gas nozzle;

a projection optical system and a viewing optical system supported on said torch body, the first projecting a light pattern through said central aperture onto a workpiece and the second viewing the weld puddle and light pattern through said central aperture and providing an image to be transferred to a controller;

said projection and viewing optical systems being inclined away from one another at an optimum angle, determined by the angle of reflection, to intercept the light reflected from the projected light pattern.

2. The welding torch of claim 1 and means for adjustably mounting said optical systems on said torch body to independently vary the angle of inclination.

3. The welding torch of claim 2 wherein each optical system includes a coherent fiber optic bundle to transfer the remotely generated light pattern to the torch and to transfer said image to a video camera.

4. An improved gas tungsten arc welding torch for robotic welding comprising:

a ring-shaped torch body having a central aperture, a slim profile electrode holder in the form of a radial arm for holding a tungsten electrode on a torch axis, and cover gas, coolant, and electrical power connections;

a shroud on said torch body to which a gas cup is attached;

projection and viewing optical systems both adjustably mounted on said torch body at a variable angle with respect to the torch electrode axis, the first projecting a structured light pattern through said central aperture onto a workpiece at an adjustable position with respect to the electrode, and the second viewing the weld puddle and structured light pattern through the same central aperture and providing an image of the weld region;

the optical axes of said projection and viewing optical systems having approximately equal inclinations tilted away from one another to optimize the light reflected from the projected light pattern on the workpiece that is intercepted by said viewing optical system.

5. The welding torch of claim 4 wherein both optical systems are swivel-mounted and have a ball-and-socket joint with a cap on said torch body.

6. The welding torch of claim 4 wherein each optical system includes a lens and the end of a coherent fiber optic bundle, and means for respectively focusing the light pattern at the end face of one bundle onto the workpiece and for focusing the image onto the end face of the other bundle.

7. The combination of the welding torch of claim 6 with means for remotely generating said structured light pattern which is transferred by one fiber optic bundle to the torch, and with a video camera and controller to which the image is transferred via the other fiber optic bundle.

8. A welding system comprising:

an arc welding torch including a conductive torch body having a central aperture and a slim profile electrode holder for holding the electrode on a torch axis, an integral projection optical system to project a structured light pattern through said central aperture onto a workpiece, and an integral viewing optical system to view the weld puddle and light pattern through the same central aperture and provide an image of the weld region, the optical axes of said projection and viewing systems having approximately equal angles with respect to the torch axis to optimize the light reflected from said light pattern which is intercepted by said viewing system;

a remote light source and means for generating said light pattern and transferring it by a first fiber optic bundle to said welding torch; and a video camera and a welding controller to which said weld region image is transferred via a second fiber optic bundle.

9. The welding system of claim 8 and means for adjustably mounting said projection and viewing optical systems on said torch body to vary the angle of inclination and give significant freedom in positioning said structured light pattern relative to said electrode.

* * * * *